No. 610,044. Patented Aug. 30, 1898.
D. GLENN.
BALL BEARING SCREW JACK.
(Application filed Oct. 7, 1897.)
(No Model.)
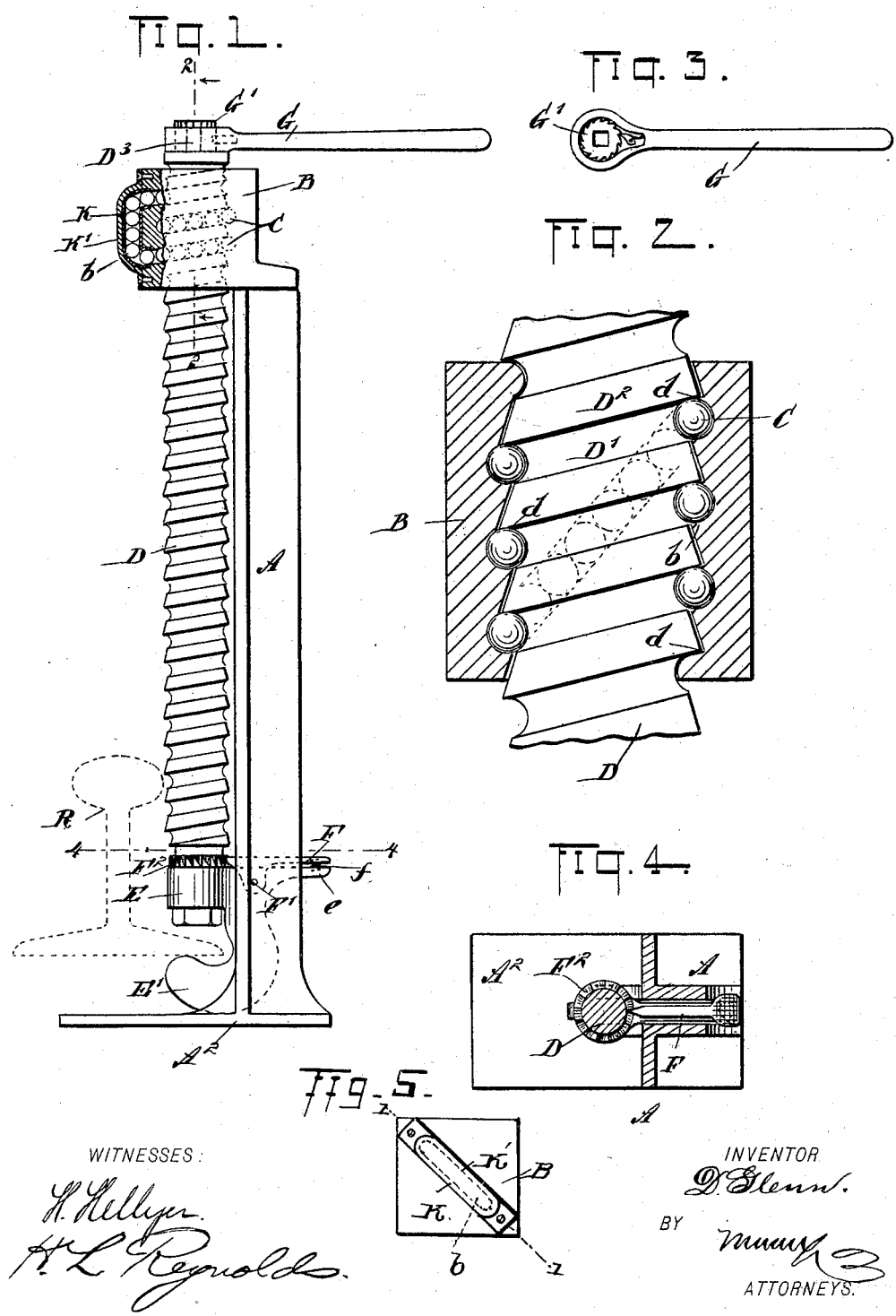

UNITED STATES PATENT OFFICE.

DANIEL GLENN, OF DEL RIO, TEXAS.

BALL-BEARING SCREW-JACK.

SPECIFICATION forming part of Letters Patent No. 610,044, dated August 30, 1898.

Application filed October 7, 1897. Serial No. 654,355. (No model.)

*To all whom it may concern:*

Be it known that I, DANIEL GLENN, of Del Rio, in the county of Val Verde and State of Texas, have invented a new and Improved Ball-Bearing Screw-Jack, of which the following is a full, clear, and exact description.

My invention relates to certain improvements in screw-jacks; and it consists in a peculiar shape of the thread, by which the thrust-surfaces upon the shaft and nut are substantially at right angles to the direction of the thrust; also, in a stop mechanism which will prevent backward rotation of the jack and which may be readily released at will.

Reference is to be had to the accompanying drawings, forming a part of this specification, in which similar characters of reference indicate corresponding parts in all the views.

Figure 1 is a side elevation of my invention as applied to a rail-jack, a portion of the nut being in section on the line 1 1 in Fig. 8. Fig. 2 is a vertical cross-section on the line 2 2 in Fig. 1, showing a portion of the screw-shaft in place. Fig. 3 is a top plan view of a ratchet-lever for engaging the upper end of the screw-shaft. Fig. 4 is a sectional plan view upon the line 4 4 of Fig. 1. Fig. 5 is an elevation of the face of the nut having the ball-race connecting opposite ends of the nut.

In using balls as a bearing between a threaded shaft or bolt and a nut the threads as ordinarily constructed result in communicating considerable outward or radial strain upon the nut by reason of the fact that the bearing-surface of the balls between the nut and screw varies considerably from a right angle to the axis of the screw. In my device the thread is made of a peculiar shape and upon the surface which receives the thrust is extended outward over the center of the ball, so as to form a bearing-surface which communicates the strain in the line of the axis of the shaft. This construction is clearly shown in Fig. 2. As therein shown the bottom of the thread is made rounding at D' to fit the balls C. The side or flank of the thread $d$ which receives the thrust is made rounding and extends upward to a point beyond the center of the balls. The other flank of the thread extends from this point in a straight line to or near the base of the adjacent thread, thus enabling the corresponding flank of the thread upon the nut to reach a point where it will pass beyond the center of the balls, furnishing a bearing-surface similar to that upon the shaft. By reason of this construction the pressure between the shaft D and the nut B is communicated substantially in lines parallel to the axis of the screw. This avoids the outward or radial thrust, which has a tendency to burst the nut and also to increase the pressure between the parts, and consequently the friction, as well as create increased wear between the balls C and the surface of the nut and screw. The nut B is provided with a return-channel $b$, as shown in Figs. 1 and 5.

My device is shown in Fig. 1 as applied to a track or rail jack. This jack comprises two uprights A, slightly separated to admit between them the hook E', which is attached to the lower end of the screw-shaft D by a collar E, surrounding the same, said hook being adapted to be placed beneath the flange of the rail and constituting with the collar E a load-support. The lower end of the screw-shaft D is provided with a ratchet-wheel $F^2$, and the hook is provided with a ratchet-lever F, which at one end engages the teeth of the ratchet-wheel $F^2$. This lever is pivoted at F' on the collar E and has its outer end extending a slight distance beyond the posts A. The hook is provided with an arm $e$, extending rearwardly beneath the outer end of the ratchet-lever. The ratchet-lever is normally held in engagement with the ratchet-wheel by means of a small spiral spring $f$. The lever F engages the ratchet-wheel $F^2$ and prevents the backward rotation of the screw-shaft upon the release of said shaft. When it is desired to run the jack down, the operator removes the hand-lever G and places his foot upon the lever F, thus releasing it from the ratchet-wheel $F^2$ and permitting a free rotation of the screw-shaft D. The rail R upon which the jack is being operated is shown in dotted lines in Fig. 1. The lower ends of the posts A are attached to a base $A^2$, which extends forward, so that it may be inserted beneath the rail. The upper end of the screw-shaft above the nut B is provided with a square end $D^3$, adapted to receive a ratchet-wheel G', which is attached to a lever G. This lever is provided with a pawl adapted to engage the ratchet-wheel and thereby communicate its motion to the screw-shaft.

The construction herein shown provides a jack-screw which may be operated with much less friction and wear than the ordinary jack-screw and one in which the friction and wear will be less than where a ball-bearing thread and nut of the ordinary construction is used. The nut in this construction need not be as strong for the same power as one of the ordinary construction and will, moreover, wear longer, the pressure being perpendicular to the surface and equal only to the weight of the load being lifted. The direction of the pressure upon the surface of the balls being parallel with the axis of the screw, the pressure is not increased above that of the weight by reason of any angularity in the pressure upon the balls.

The return channel or raceway for the balls in the nut is formed by boring a hole from one side of the nut to an intersection with the thread of the nut, both at the top and bottom. These holes are counterbored to receive the tube K, bent at both ends and having a bore of such size as will permit the balls to pass readily therethrough. The tube is then secured by the plate K', as shown in Figs. 1 and 5.

Having thus described my invention, I claim as new and desire to secure by Letters Patent—

1. A ball-bearing screw and nut, each having the flank of the thread receiving the thrust curved to fit the balls and extending over the center of the balls, and the opposite flank of the thread sloping from the point to the root of the thread, the nut having an inclosed passage or ball-race connecting its opposite ends, substantially as described.

2. A screw-jack comprising a threaded shaft and a nut, balls between them, a load-support mounted on one end of the shaft and adapted to engage the object to be lifted, a pawl or ratchet lever mounted on said support, and a ratchet-ring upon the shaft, engaged by said pawl-lever to prevent backward rotation of said shaft, substantially as described.

3. A screw-jack comprising a threaded shaft and a nut, balls between them, a load-support mounted on one end of the shaft and adapted to engage the object to be lifted, an upwardly-facing ratchet-wheel secured to turn with the threaded shaft, and a pawl-lever pivoted on the support and engaging said ratchet-wheel, the opposite end of said lever projecting outward for engagement by the operator's foot to release the ratchet-wheel, and a spring normally holding said pawl-lever in engagement with said wheel, substantially as described.

DANIEL GLENN.

Witnesses:
ROBERT G. HUDSON,
WILLIAM SNEDDAN.